July 21, 1953
R. L. JACKSON
2,646,170
APPARATUS TO SEPARATE COTTONSEED
FROM A NEUTRALIZING AGENT
Filed Sept. 11, 1948
2 Sheets-Sheet 1
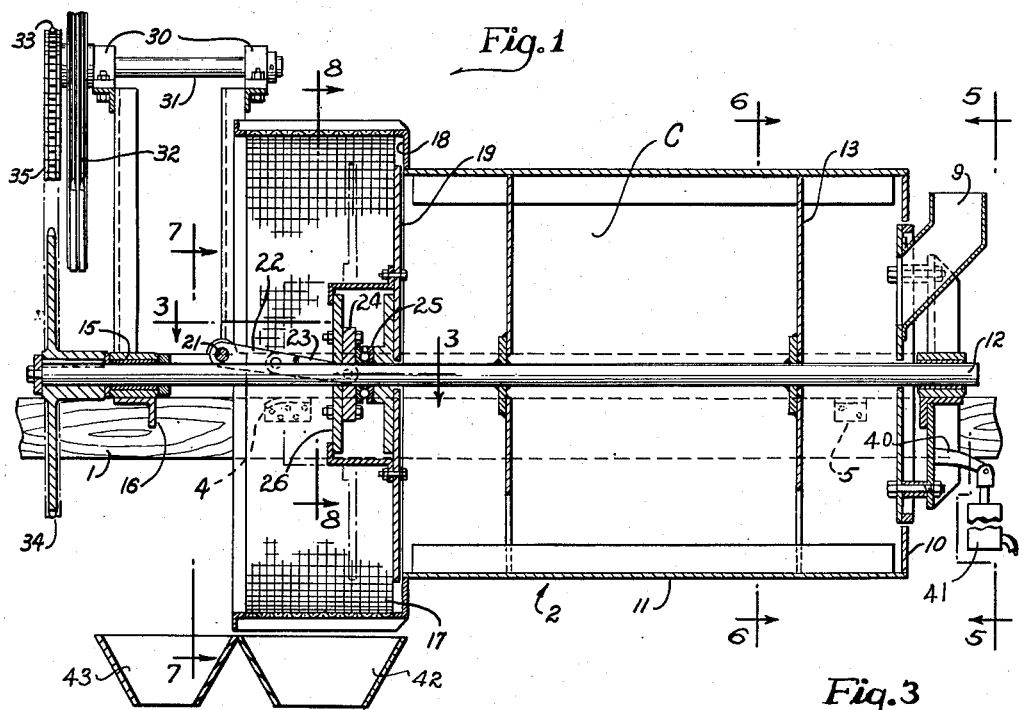
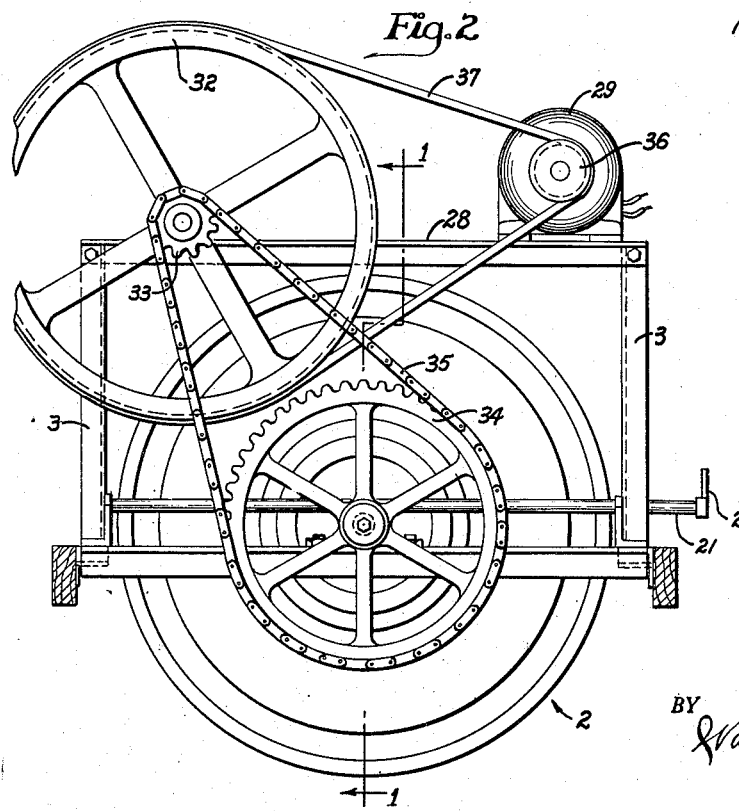
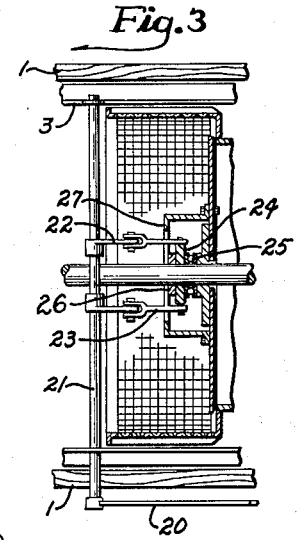
INVENTOR.
Robert L. Jackson
BY Wayland D. Keith
His Agent July 21, 1953  R. L. JACKSON  2,646,170
APPARATUS TO SEPARATE COTTONSEED
FROM A NEUTRALIZING AGENT
Filed Sept. 11, 1948  2 Sheets-Sheet 2
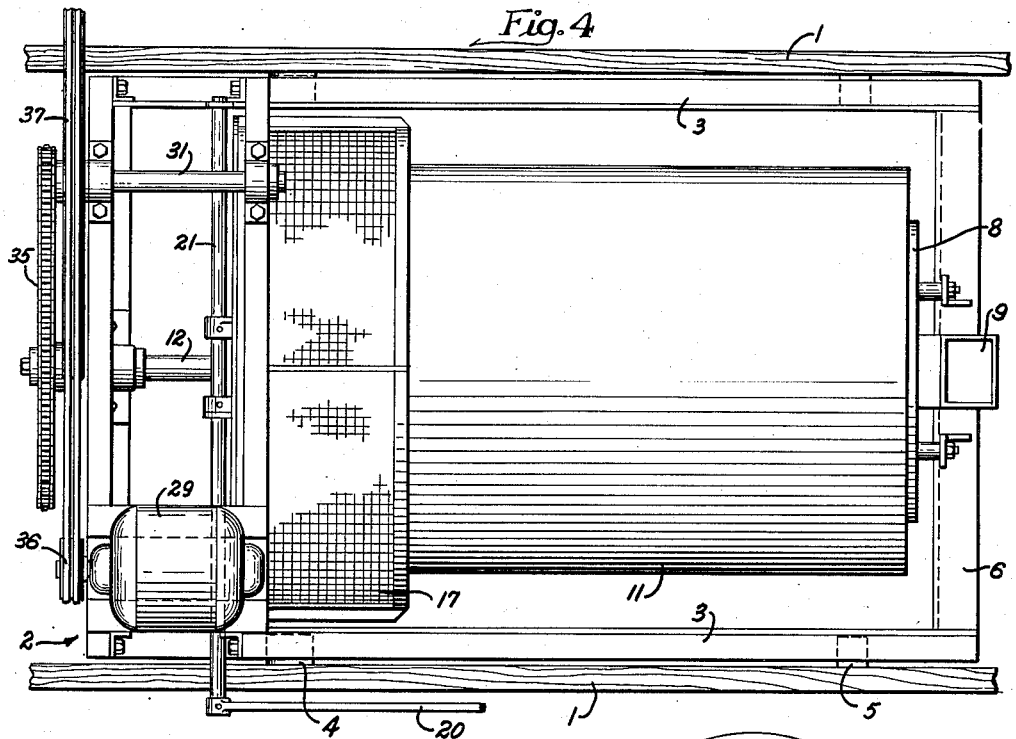
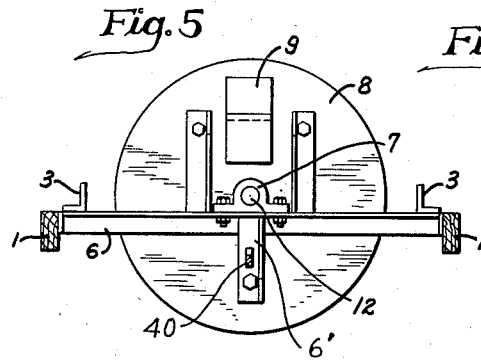
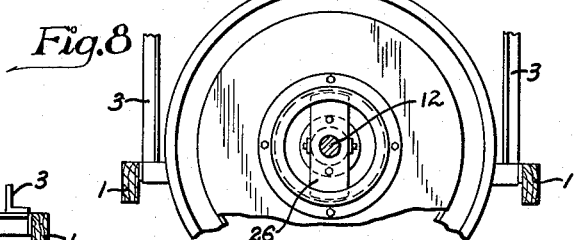
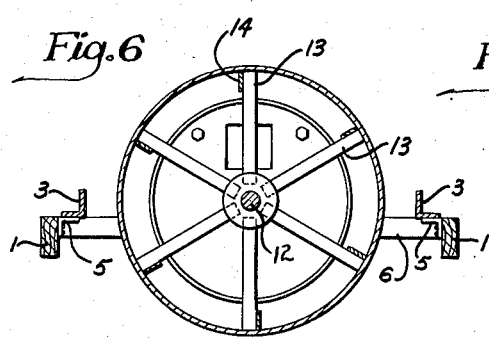
INVENTOR.
Robert L. Jackson
BY Wayland D. Keith
His Agent Patented July 21, 1953

2,646,170

UNITED STATES PATENT OFFICE 2,646,170

APPARATUS TO SEPARATE COTTONSEED FROM A NEUTRALIZING AGENT

Robert L. Jackson, Lubbock, Tex.

Application September 11, 1948, Serial No. 48,895

2 Claims. (Cl. 209—284)

This invention relates to improvements in apparatus for acid neutralizers for relinted cottonseed, and more particularly to a machine that will efficiently and effectively neutralize all the seed passing therethrough and remove therefrom the excess neutralizing agent used.

The present invention is composed of a single composite unit, which comprises a cylindrical drum in which to agitate together the seed and the neutralizing agent, which may be lime or other suitable neutralizing alkalines. The screening drum may be made integral with the treating drum, and powered with the same motor unit, so that the complete process may be practiced within a single machine, so as to simplify and expedite the neutralizing of a residual acid-gas present on the surface of delinted cottonseed.

The methods used heretofore in the neutralization of acid-gas on the surface of delinted cottonseed, generally involves the use of a considerable quantity of lime, or other neutralizing agent, and when mixed with the seed by hand with shovels and the like, resulted in very uneven distribution of the neutralizing agent, therefore some of the seed might be thoroughly treated, while some might still have the same dry acid-gas, such as hydrochloric, or other suitable gas. This acid is highly destructive to the fiber bags in which it is customary to ship the delinted cottonseed. If the acid-gas remained on the seed, the bag disintegrated, which resulted in the loss of the seed.

The present invention provides an apparatus whereby all seed may be so thoroughly mixed with the neutralizing agent, that there is no danger of the gas remaining to destroy the bags.

The primary object of this invention is to provide an apparatus for neutralizing the dry acid-gas on the surface of, or associated with delinted cottonseed and the like.

Another object of this invention is to provide a method of and apparatus for neutralizing dry acid-gas present on, or associated with delinted cottonseed or the like, which apparatus is a single composite machine in which the cotton seed can be mixed with the neutralizing agent, and from which excess neutralizing agent can be removed from the treated seed at a single operation.

A still further object of this invention is to provide a composite apparatus that is simple in construction, and inexpensive and effective in operation.

In carrying out the objects of this invention reference is to be had to the accompanying drawings in which:

Fig. 1 is a longitudinal sectional view of the apparatus, taken on the line 1—1 of Fig. 2, looking in the direction indicated by the arrows;

Fig. 2 is a front elevational view of the machine with the supporting sills therefor shown in section;

Fig. 3 is a sectional view taken on the line 3—3 of Fig. 1, looking in the direction indicated by the arrows, showing a fragmentary portion of the sliding door mechanism;

Fig. 4 is a top plan view of the apparatus;

Fig. 5 is a rear sectional view taken on the line 5—5 of Fig. 1, looking in the direction indicated by the arrows, but on a reduced scale;

Fig. 6 is a sectional view taken on the line 6—6 of Fig. 1, looking in the direction indicated by the arrows, but on a reduced scale;

Fig. 7 is a fragmentary sectional taken on the line 7—7 looking in the direction indicated by the arrows; and Fig. 8 is a fragmentary sectional view taken on the line 8—8 of Fig. 1, looking in the direction indicated by the arrows, but on a reduced scale.

With more detailed reference to the drawing, the numeral 1 designates sill members, which sill members are adapted to support the composite apparatus generally designated by the numeral 2. A frame 3 is adapted to be supported by brackets 4 and 5. The support bracket 4 is formed with an arcuate upper surface to permit the raising of the "charge" end of the machine, when it is desired to discharge the treated seed from the "discharge" end of the machine.

The frame 3 has a transverse frame member 6 mounted between frame members 3 and adapted to support a bearing 7 thereon. The frame member 6 is also adapted to support the end member 8 and the charge chute 9, as will best be seen in Figs. 5 and 6. The end member 8 and the charge chute 9 remain in stationary relation with respect to the frame member 6. However, the end member 8 is in close fitting relation with the end member 10 of the drum 11, so as to prevent loss of seed or neutralizing agent from between the members 8 and 10.

The drum 11 is supported on an axial shaft 12 by spokes or spider members 13, as will best be seen in Figs. 1 and 6. Agitator blades 14 are circumferentially spaced within the inner diameter of the drum 11 and are secured to the spokes 13, near the outer ends thereof, so as to agitate and admix the neutralizing agent and the seed, upon rotation of drum 11 on the shaft 12. The opposite end of the shaft 12 is journaled in a bearing 15, which bearing is mounted on a cross member 16 that is positioned between frame members 3.

A screen member 17 is secured to an end of the drum 11, opposite the charge end, and is of larger diameter than the drum on which it is mounted, so as to form a shoulder 18 therearound. A plate 19 is slidably mounted on shaft 12 and is adapted to be moved thereon by means of a lever 20, which lever 20 is connected to the sliding plate 19 by a shaft 21 journaled on frame members 3, and which shaft has arms 22 connecting with linkages 23, which, in turn, are connecting with a yoke 24 that is positioned between thrust bearings 25 and retaining bar 26, which bar is positioned within the in-turned rim of retaining cap 27.

By rocking lever 20 through approximately 90 degrees, the plate 19 will be moved away from, or positioned in contact relation with shoulder 18. When the plate 19 is moved away from contact relation with the shoulder 18 the seed may be discharged from chamber C into the screen, but when the plate 19 is in contact relation with the shoulder 18, the seed will be retained within the chamber C, to be treated therein with the acid neutralizing agent. It is preferable to have the lever 20 so positioned as to cause the closed plate 19 to exert a slight pressure against shoulder 18, just before dead-center position is reached, as shown in Fig. 1. Then with a short additional travel in the same direction, the arms 22 and linkages 23 form a toggle action to exert a pressure on plate 19, which will make it unnecessary to hold the lever 20 in place.

Cross frame members 28 are provided upon which a motor 29 is mounted, as are bearings 30, in which is journaled shaft 31, as will best be seen in Figs. 1 and 4. The shaft 31 is adapted to carry a large pulley, such as a V-belt pulley 32, which is adapted to be secured near one end thereof and to the sprocket 33, also secured thereon. The sprocket 33 is adapted to drive sprocket 34 by a chain 35. The motor 29 has a pulley 36 thereon, which is adapted to drive V-belt 37 to rotate V-belt pulley 32, as will best be seen in Fig. 2. The pulley 34 is secured to, and drives shaft 12 so as to rotate drum 11 and screen 17 in unison.

It is to be pointed out that the power drive mechanism assembly 29—37, is mounted upon frame 3 as is the drum member 11 and screen member 17. Therefore, the unit will operate whether in horizontal position, or tipped at an angle, and may be moved from horizontal to dump position as a composite unit, without disrupting the drive operation thereof.

A lug 40 is mounted on and projects outward from the structural member 6' directly below the charge chute 9 to which lug a hydraulic jack 41 is operably connected. The hydraulic jack is adapted to lift the charge end of the seed treating apparatus sufficiently to give it the correct angle to cause the seed to discharge outward by plate 19 when in open position. While a hydraulic jack has been shown it is to be understood that any method of raising the end of the said treating apparatus may be used.

A pair of hoppers 42 and 43 are mounted near the discharge end of screen 17. The hopper 42 is mounted directly beneath the screen 17 to catch the lime sifted from the neutralized seed being discharged from the chamber C, which lime may be re-used until its effectiveness becomes neutral. The hopper 43 is positioned at the discharge end of the screen 17 so that the seed discharged from screen 17 will be directed into a suitable container, such as a sack.

*Operation*

In the operation of the apparatus, the desired amount of delinted cottonseed, which have dry acid-gas present on the surface thereof, are charged into the chamber C through inlet 9. The acid neutralizing agent, such as lime, is also placed within the chamber C through inlet 9. The inlet is then closed, and the motor actuated, which causes the rotation of the drum 11. The blades 14, within the drum are also rotated therewith which agitates and mixes the delinted seed with the neutralizing agent as the drum rotates to further the treating process. This is continued until all of the seed within the drum have been thoroughly treated with the neutralizing agent; then the plate 19 is shifted from the position as shown in full lines in Fig. 1, to the position as shown in dot-dash outline, and, due to the difference in diameter of drum 11 and screen 17, the seed will discharge into screen 17, when the charge end of the apparatus is raised. The rate of discharge of the treated seed from chamber C into the cylindrical screen 17 will depend upon the angular position of the drum 11 and on the width of the opening between plate 19 and shoulder 18. The angular disposition of the machine will also gauge the rate of discharge of seed from the drum 11; therefore, it can be readily appreciated that the apparatus may be charged to capacity with acid active seed, together with the neutralizing agent, and processed the required length of time so that all the acid will be neutralized, and the seed becomes basic. Then the apparatus is tipped at an angle and the rotation continued, which means that the drum 11 and screen 17 are being rotated in unison, and with the plate 19 defining a gauged opening with the shoulder 18, the seed and neutralizing agent are discharged from drum 11 into screen 17, and by continuing the rotation of the apparatus, the excess neutralizing agent is sifted out through the screen 17 into a suitable container, and the seed are discharged into a suitable hopper or the like, for sacking.

In this manner the excess lime, or other neutralizing agent may be recovered for use over and over, until its neutralizing property is spent. The seed so treated may be packed in fiber bags without fear or thought of excess neutralizing agent being present therein. Farmers who purchase the treated seed object to the presence of excess neutralizing agent, as it may cause the planters which are planting the seed to become clogged. Furthermore, the treated seed is usually sold by the pound, and is objectionable to have excess lime or the like in the seed bags, to cause excess weight. With the use of the present apparatus the proper ratio of lime and seed is maintained, and at the same time the seed is thoroughly treated against active acid, and the seed will remain chemically basic for many months.

It is to be pointed out that a machine of this construction is light in weight and easy to transport, and that it may be effectively operated by a single operator. It may be either manually tilted for discharge, due to balance, or that any convenient method of tilting may be used, such as a block and tackle, jack or the like.

The alkaline material may be added to the seed and fed into the drum inlet continuously, and the drum 11 elevated to a predetermined angle to cause the seed to feed through the drum and screen chamber in a continuous manner. With the closure 19 set for a gauged opening, the seed may be processed and treated in a continuous manner.

Having thus described the invention, I claim:

1. An apparatus for treating delinted cottonseed comprising a frame, bearings mounted on said frame, a shaft journaled in said bearings, means for rotating said shaft, spokes secured to said shaft and radiating outwardly therefrom, a container connected to and mounted on said spokes to be supported thereby with respect to said shaft, said container having an opening formed in each end thereof, one of said openings being substantially closed by a plate member, said plate member having an inlet opening formed therein, a slidable plate mounted for closing the opening in the opposite end of said container when in one position, operating means connected to said slidable plate exterior of said shaft and extending outwardly therealong for moving said slidable plate member so said opening may be closed by said slidable plate member while said container is rotating, said operating means being journaled on said shaft near an end of said container, a cylindrical screen member of larger diameter than the diameter of said container secured to and surrounding an end of said container so as to form an enlarged spokeless chamber, said opening in said container being adapted to discharge cottonseed into said screen chamber when said slidable plate is in open position.

2. In an apparatus for treating delinted cottonseed, a frame, bearings mounted on said frame, a shaft journaled in said bearings, means for rotating said shaft, spokes secured to said shaft and radiating outwardly therefrom, a drum mounted on said spokes and supported thereby in spaced relation with respect to said shaft, said drum comprising a cylindrical member having an opening formed in each end thereof, one of said openings being substantially closed by a disc member, said disc member having an inlet opening formed therein, a slidable disc member mounted on said shaft to close the opening in the opposite end of said drum when in one position, operating means connected to said slidable disc member exterior of said shaft and extending outwardly therealong for moving said slidable disc axially while said drum is rotating so said opening may be closed while said drum is rotating, a cylindrical screen of larger diameter than the diameter of said drum encircling said disc member and being connected to an end of said drum, and the outer end of said screen member being open to permit the discharge of said treated seed through an annular passage formed between the outer periphery of said slidable disc and the inner diameter of said screen member when said slidable disc is in open position.

ROBERT L. JACKSON.

References Cited in the file of this patent

UNITED STATES PATENTS

| Number | Name | Date |
|---|---|---|
| 38,783 | Cookson | June 2, 1863 |
| 1,090,326 | Michaelsen | Mar. 17, 1914 |
| 1,498,379 | Jahn | June 17, 1924 |
| 1,573,340 | Weitman | Feb. 16, 1926 |
| 1,733,314 | Phillips | Oct. 29, 1929 |
| 1,846,510 | Busse | Feb. 23, 1932 |
| 2,080,508 | Sackett | May 18, 1937 |
| 2,185,408 | Kettenbach | Jan. 2, 1940 |
| 2,337,209 | Seeber | Dec. 21, 1943 |
| 2,388,902 | Callaghan | Nov. 13, 1945 |
| 2,437,397 | McLemore | Mar. 9, 1948 |
| 2,515,725 | McLemore | July 18, 1950 |

FOREIGN PATENTS

| Number | Country | Date |
|---|---|---|
| 945 | Germany | Aug. 4, 1877 |